United States Patent [19]

Chu

[11] Patent Number: 4,865,550
[45] Date of Patent: Sep. 12, 1989

[54] ANATOMICAL EDUCATIONAL AMUSEMENT RIDE

[76] Inventor: Shao-Chun Chu, 608 N. Sierra Vista, Monterey Park, Calif. 91754

[21] Appl. No.: 146,251

[22] Filed: Jan. 20, 1988

[51] Int. Cl.$^4$ .................... G09B 23/30; A63B 31/00; A63B 31/16
[52] U.S. Cl. .................................. 434/267; 434/272; 272/2; 104/53; 104/84
[58] Field of Search ...................... 434/267, 266, 272; 272/8 R, 2, 3, 9; 104/53, 84, 85

[56] References Cited

U.S. PATENT DOCUMENTS

| | | |
|---|---|---|
| 86,683 | 4/1932 | O'Neil . |
| 268,503 | 12/1882 | Lafferty . |
| 339,828 | 4/1986 | Ward . |
| 641,839 | 1/1900 | Clay . |
| 845,967 | 3/1907 | Moscovitz ............................ 104/84 |
| 1,738,752 | 12/1929 | Thomas . |

FOREIGN PATENT DOCUMENTS 1566945  5/1980  United Kingdom .................... 272/2

OTHER PUBLICATIONS

"The Science Teacher", Feb. 1974, p. 19.
The Anatomy Coloring Book, Wynn Kapit et al., Harper & Row, 1977 (Cover, Title Page, Table of Contents, and Plates 50, 84, 86).

Primary Examiner—Edward M. Coven
Assistant Examiner—Valerie Szczepanik
Attorney, Agent, or Firm—Sheldon & Mak

[57] ABSTRACT

An educational amusement apparatus forms a large building structure having an external appearance simulating a man and a woman resting partially under a blanket, wherein riders are taken through a succession of cavities that simulate internal organs of the man and woman. Entrance to a head chamber simulating an oral cavity is achieved by a stairway supported by a simulated arm of the man, the oral cavity having displays of teeth in normal and abnormal conditions, and serving as a staging area for a train to carry the riders. The train passes into a simulated cranial cavity of the woman, past a sectional display of simulated ear organs, and into a body portion of the building that is representative of the abdomen of both the man and the woman, first through a simulated esophagus, stomach, and intestine of an alimentary canal, through simulated urinary and reproductive tracts, then through a simulated liver and a simulated cardiovascular canal, and finally through a simulated lung and windpipe to an exit staging area of the building.

4 Claims, 4 Drawing Sheets

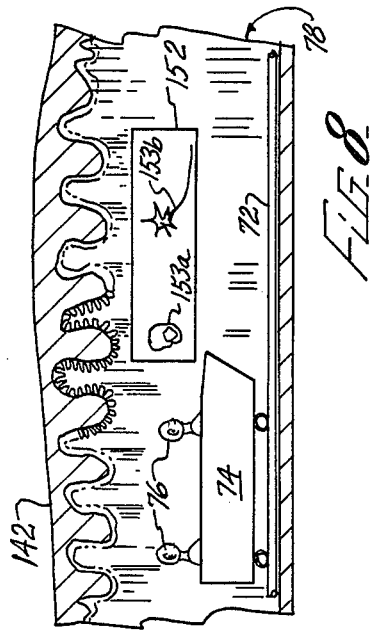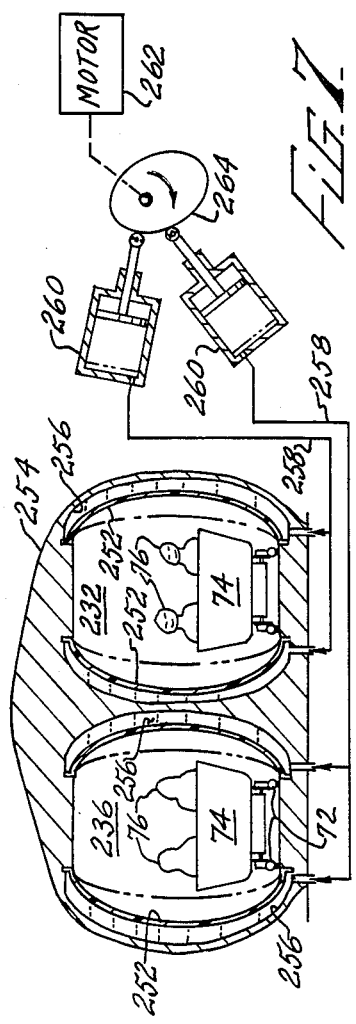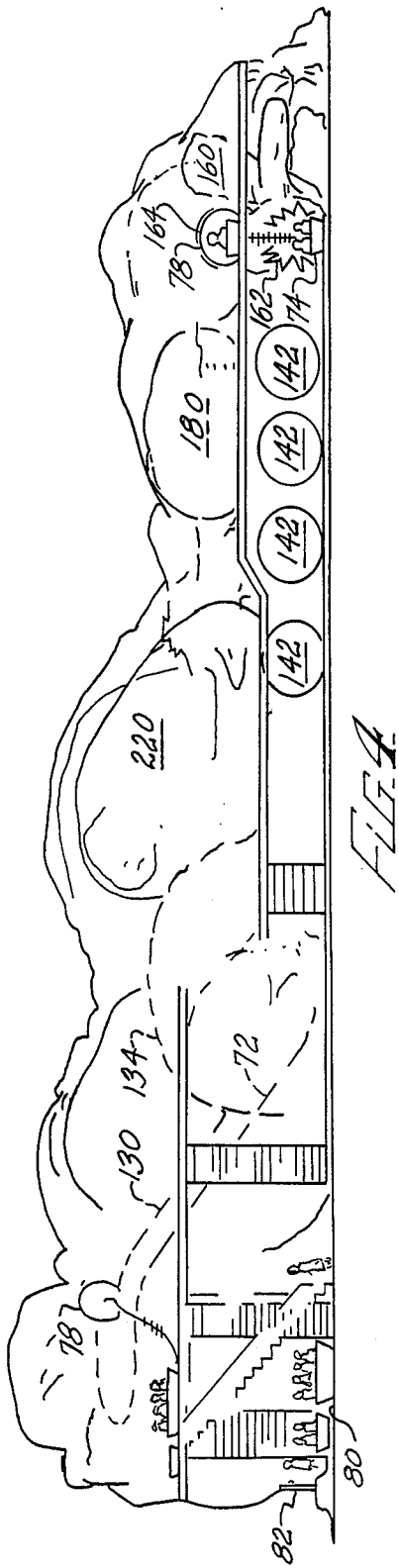

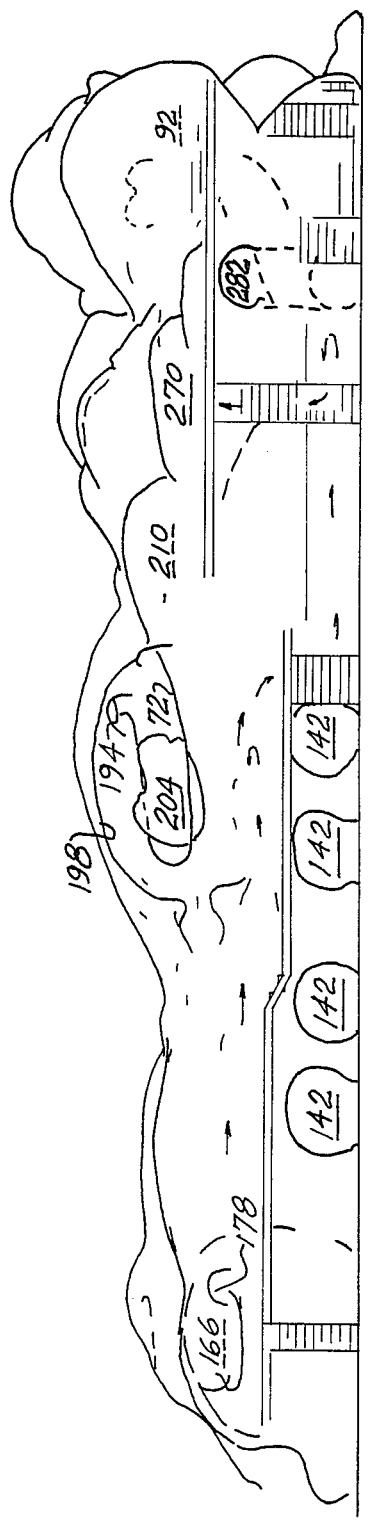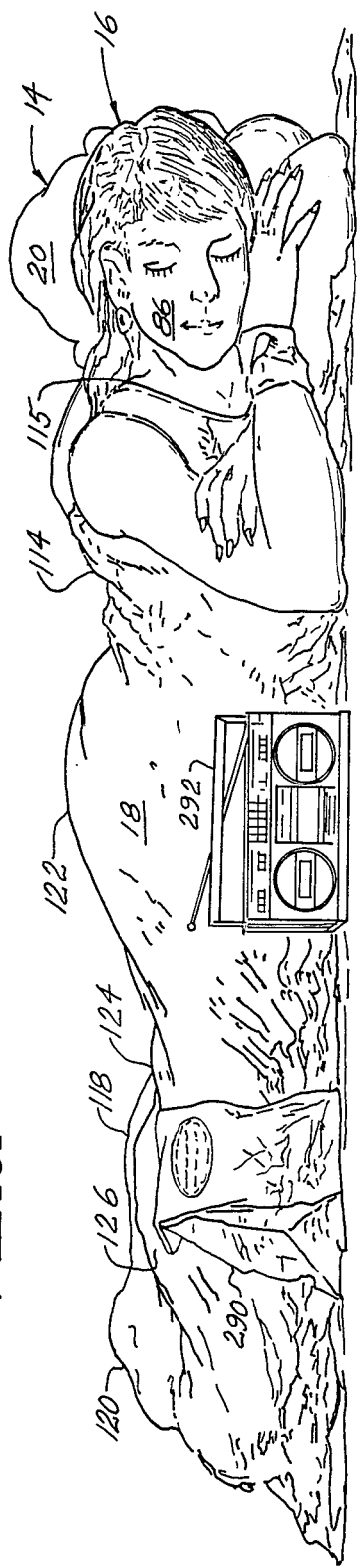

ANATOMICAL EDUCATIONAL AMUSEMENT RIDE

BACKGROUND

The present invention relates to amusement rides and more particularly to a large-scale ride structure that is adapted for teaching mammalian anatomy.

Typical amusement rides of the prior art include those primarily oriented to extreme physical sensation such as roller coasters and the like, and those oriented primarily toward the exhibition of cultural and artistic material such as the Small World Ride at Disneyland.

It is well known that many people abuse their bodies in various ways, at least partly out of ignorance, as those who seriously study physiology and other medical subjects are only a small minority of the population. It is also known that many people are not motivated to take care of their bodies until they become relatively advanced in age, and pathological conditions which could have been avoided are already present. On the other hand, many young people are curious about their bodies and would be attracted to a recreational ride that revealed the inner workings of the human body.

Accordingly, there is a need for an amusement ride apparatus that facilitates education regarding the human body, pathological conditions thereof, and how to avoid them, that is attractive to riders, and is effective in transporting a large ridership.

SUMMARY

The present invention satisfies this need by providing educational amusement ride apparatus that simulates exterior and interior aspects of living beings. In one aspect of the invention, the apparatus includes a building structure for simulating the external shape of a living organism and having an entrance and exit for visitors thereof, a passage for guiding the visitors between the entrance and exit, and a plurality of chambers within the structure for simulating internal organs of the organism along the passage, the visitors being exposed to comparative simulation of normal and abnormal body conditions of the organism. The term "organ" is used in a general sense herein, and is meant to include structural aspects of the body such as cells, muscles, bones, joints, etc. The organism can be an animal, a mammal, and most advantageously, a human being for inducing the visitors to more properly take care of their own bodies.

The building structure can be formed to simulate the external appearance of two or more of the organisms, the passage having portions within each of them. Also, the apparatus can include track means for transporting the visitors as riders through the passage. Further, the apparatus can be provided with means for informing the visitors regarding steps in avoiding a depicted abnormal body condition.

Preferably, at least two kinds of the organs are simulated, the kinds being selected from the class consisting of a cell, a tissue, a bone, a joint, a muscle, a cardiovascular organ, a lymphatic organ, a respiratory organ, a digestive organ, a veinary organ, a reproductive organ, an integumentary organ, an endocrine organ, and a nerve organ. For example, the chambers can advantageously include simulated alimentary canal and cardiovascular canal portions. Also, both arterial and venal canal portions can be simulated in the chambers. Further, the chambers can simulate first and second heart chamber portions. Preferably at least one of the heart chambers is flexible and provided with pulsatory motion simulating a heartbeat. Further, the chambers can include simulated urinary and reproductive tract portions. The apparatus can have a chamber simulating an ovary, with eggs in stages of development and delivery, and a uterine chamber portion showing a developing fetus therein. Moreover, there can be chambers simulating a respiratory canal, and a cranium showing portions of a brain.

In another aspect, the apparatus includes a humanoid-shaped building structure having a body portion, a head portion, and an interconnecting neck portion, a first passage within the structure for simulating internal human physiology, track means for transporting riders along the passage, and output means for presenting recorded physiological information to the riders. Preferably the head portion includes mouth and chin members, and a head chamber for simulating an oral cavity and for receiving the riders proximate the mouth member, the exterior of the structure also having arm and hand portions simulating support of the chin and being adapted for guiding the riders into the head chamber from the outside. Preferably the head chamber has teeth simulating normal and abnormal tooth conditions. Loading means for the track means can be located for receiving the riders proximate the head chamber.

DRAWINGS

These and other features, aspects, and advantages of the present invention will become better understood with reference to the following description, appended claims, and accompanying drawings where:

FIG. 3 is a left side elevational view of the structure of FIG. 1;

FIG. 4 is a left side fragmentary sectional elevational view of the structure of FIG. 1;

FIG. 5 is a right side elevational view of the structure of FIG. 1;

FIG. 6 is a right side fragmentary sectional elevational view of the structure of FIG. 1;

FIG. 7 is a schematic diagram showing a mechanism for producing pulsatory movement in flexible walls of simulated heart chambers of the apparatus of FIG. 1; and FIG. 8 is a fragmentary sectional elevational view of an alimentary canel portion of the structure of FIG. 1 showing a display unit for simulating other organs.

DESCRIPTION

Figure 1:
FIG. 1 is a plan view of an educational amusement building structure according to the present invention.
Figure 2:
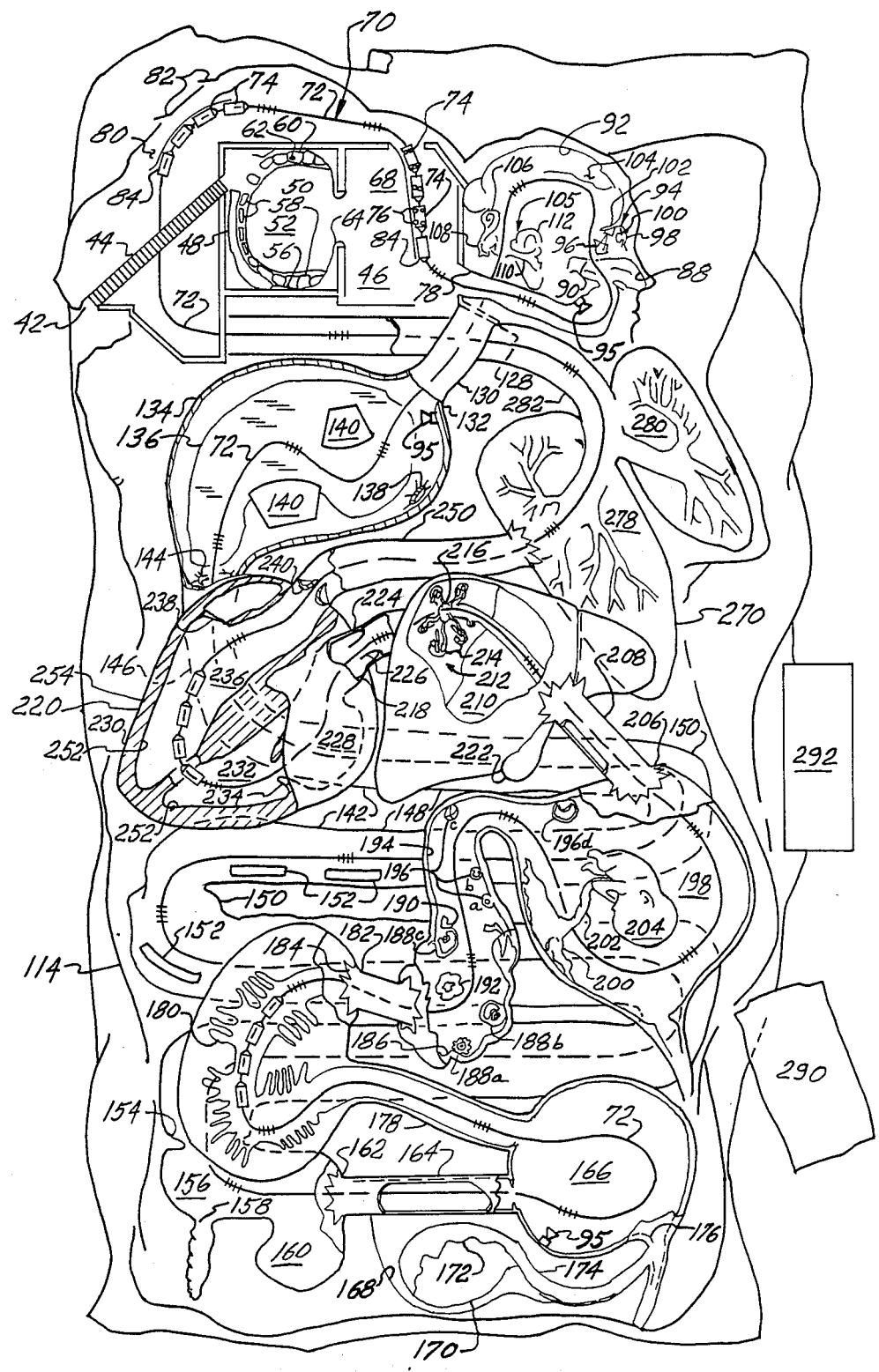
FIG. 2 is a fragmentary sectional plan view of the structure of FIG. 1.

The present invention is directed to an educational amusement ride apparatus that forms a large building structure for training visitors in life science. With reference to the drawings, particularly FIGS. 1-6, an amusement apparatus 10 according to the present invention has a large building structure 12 externally having the appearance of a living organism. Methods for forming the external appearance of the structure are known those skilled in the building trades, particularly those engaged in amusement park construction and film production. Generally, any life form can be depicted, including plant and animal forms. Most instructive and interesting, however, are the higher forms of mammals, such as man.

As shown in the drawings, the structure 12 is formed for simulating a man 14 and a woman 16 resting partially under a blanket 18, the structure having a head portion 20 connected to a neck portion 22, and shoulder portion 24 of the man 14, the shoulder portion 24 being apparently propped in a partially raised position by a right arm portion 26 and a left arm portion 28. The right arm portion 26 extends downwardly and forwardly to an elbow portion 30 proximate ground level, then upwardly as a forearm portion 32 to a hand portion 34, the hand portion 34 being connected to the head portion 20 for apparently supporting a chin member 35 thereof. The left arm portion 28 extends downwardly and forwardly to a hand portion 36, the hand portion 36 being shaped for grasping a simulated drink container 38. Also, a wrist portion connecting the hand portion 36 wears a simulated timepiece 40. The head portion 20, the neck portion 22, the shoulder portion 24, and the arm portion 26 and 28 comprise a section of the structure 12 simulative of the man 14. In this connection, internal and external human physiology that is known to those skilled in the medical arts may be advantageously depicted in the present invention. Such physiology is described in *The Anatomy Coloring Book*, by Wynn Kapit and Lawrence M. Elson (Harper and Row, Publishers, New York, 1977), which is incorporated herein by reference.

An entrance 42 of the structure 12 is located at ground level in the elbow portion 30, visitors being guided up a stairway 44 that follows the forearm 32 and the hand portion 34 and into a head cavity 46 of the man's head portion 20, the visitors entering the head cavity 46 through a mouth member 48 that forms an opening therein. As shown in FIG. 3, the mouth member 48 is open to view from outside the building structure 12, so that the visitors can be seen by those approaching the apparatus 10, thereby attracting more visitors. The stairway 44 can be provided either as fixed stairs, or as an escalator.

A portion of the head cavity 46 is formed for simulating an oral cavity 50 of the man's head portion 20, including a floor portion forming a simulated tongue member 52, a roof portion forming a simulated hard palate member 54, opposite side walls each forming a simulated buccal member 56, a plurality of simulated normal teeth 58, and at least one simulated abnormal tooth 60 having a simulated cavity 62 therein. At the back of the oral cavity 50 is a simulated palatoglossal arch 64 having a simulated uvula 66 depending therefrom, the palatoglossal arch 64 forming a passage to a rider loading station 68 for a track means 70 (further described below), the station 68 being located in a rear portion of the head cavity 44.

The track means 70 includes a serpentine track structure 72 and a plurality of cars 74 transportable thereon for carrying the visitors as riders 76 from the station 28, through a passage 78 that simulates many internal organs of the man 14 and the woman 16 as further described below, to an unloading station 80 that is located proximate an exit 82 of the building structure, the exit 82 being located proximate the arm 26 of the man 14. Any of several forms of construction known to those skilled in the art of amusement rides may be used for the track means 70. Preferably, the cars 74 are relatively small, holding from 2 to 6 of the riders each, several of the cars being joined to form a plurality of trains 84. Thus the passage 78 can be quite contorted, yet a large number of the riders 76 can be efficiently transported by a relatively small number of the trains 84.

According to the present invention, a great variety of organs can be simulated, including cells, tissue, bones, joints, muscles, cardiovascular organs, lymphatic organs, respiratory organs, digestive organs, veinary organs, reproductive organs, integumentary organs, endocrine organs, and nerve organs. By simulating two or more of these kinds of organs, the apparatus 10 is an effective tool for teaching life science, and especially human physiology. The simulation need not be completely anatomically correct to achieve the desired amusement and teaching objectives. In fact, it is preferred to avoid an excess of realism in deference to the tender sensibilities of many potential visitors who have had little experience with actual or realistically simulated internal human anatomy. For this purpose, at least some of the organs can be simulated idealistically, as cartoon-like characters, having a comical appearance.

From the loading station 68, the passage 78 leads form the head cavity 46 of the man's head portion 20 into a head portion 86 of the structure 12, the head portion 86 being formed for simulating the woman 16. As shown in the drawings, the woman 16 is depicted napping, facing away from the man 14, the head portion 86 being inclined horizontally. The passage 78, together with the track structure 72, enters a simulated nasal cavity 88 of the head portion 86, then through a cribriform portal 90 into a cranial cavity 92, within which the passage 78 has an eye structure 94 for simulating an eye of the woman 16. Along the passage 78 a series of speakers 95 announce to the approaching riders 76 what they should be watching for and educational information related thereto, the speakers 95 being connected to an appropriate audio playback system (not shown).

The eye structure 94 includes a retinal portion 96 for simulating a retina, a lens portion 98 for simulating the lens of an eye, and an iris portion 100 for simulating an iris of the eye, there being a line of sight from the riders 76 through the lens portion 98 and the iris portion 100 to outside the structure 12. The lens portion 98 is focusable and the iris portion is movable for simulating corresponding eye functions. Further, a projection means 102, synchronized with the movements of the lens portion 98 and the iris portion 100, projects a simulated image onto the retinal portion 96 for demonstrating the effects of the lens and iris movements of the eye structure 94.

Also within the cranial cavity 92 is a brain structure 104 for simulating portions of the woman's brain. From the cranial cavity 92 the passage 78 is formed to include an ear structure 104 for simulating portions of the woman's ear. The ear structure 104 has an inner portion 106 for simulating the inner ear, a middle portion 108 for simulating the middle ear, and an outer portion 110 for simulating the outer ear, the outer portion 110 opening to the outside of the head portion 86 at an ear member 112 thereof for enhanced rider interest and association with the woman 16.

From the ear structure 104 the passage 78 enters a body portion 114 of the structure 12 by way of a neck portion 115 that is formed to simulate a neck of the woman 16, the head portion 86 and the neck portion 115 comprising a section of the structure 12 that is simulative of the woman 16. The body portion 114 is shaped externally for simulating portions of the blanket 18 with the man 14 and the woman 16 reclining thereunder as described above, and having a hip member 116, a leg member 118, and a foot member 120 for the man 14, and a hip member 122, a leg member 124, and a foot member 126 for the woman 16. However, the inside of the body portion 114 is formed for simulating representative abdominal organs of both the man and the woman, there being no distinction between the man and the woman except for simulated sexual organs described below. Thus the entire body portion 114 is utilized for simulating internal abdominal organs for advantageous use of the available space.

The passage 78 enters the body portion 114 at a throat portal 128 for simulating passage of the riders as food through a pharynx, and for emphasizing the transition from the head portion 86 into the body portion 114, the passage 78 next forming an esophagal portion 130 of a simulated alimentary canal 132 within the body portion 114, the esophagal portion 130 being downwardly inclined toward a stomach portion 134, the stomach portion 134 forming a lake 136 for simulating contents of a stomach. The stomach portion 134 is formed as an enlarged cavity, the walls of which are formed to simulate the appearance of stomach walls, including an ulcer formation 138 for simulating a stomach ulcer. Also within the stomach portion 134 are one or more audio-visual output consoles 140 for presenting physiological information to the visitors, the information relating to normal and abnormal body conditions, and recommended steps of action for avoiding the abnormal conditions. The consoles 140 can be made according to conventional audio-visual technology employing photographic film, magnetic tape, and/or disk recording media that is known to those skilled in that art.

From the stomach portion 134, the passage 78 enters a small intestine portion 142 of the alimentary canal 132 by way of a sphincter portal 144 that simulates a pyloric sphincter. The small intestine portion 142 is shaped generally corresponding to the human counterpart, having first a C-shaped portion 146 for simulating a duodenum, then a plurality of relatively long, slightly curved portions 148 that are connected by relatively sharp bends 150. Along the small intestine portion 142 there are, in addition to structural forms simulative of an intestinal tract, are other structures and displays 152 for exhibiting other organs, such as cells, tissue structure, muscles, bones, joints, lymph glands, ductless glands, nerves, and other information about the human body. As shown in FIG. 8, an exemplary one of such displays includes two other organs 153, designated 153a and 153b. The organ 153a simulates an enlarged cell, and the organ 153b simulates a neuron of nerve tissue. As further shown in FIG. 8, the interior of the small intestine portion 142 is shaped for simulating circular folds having mucosa including villi thereon.

The passage 78 next enters through an ileocecal portal 154 into a cecal chamber 156 of a large intestine portion 158 of the alimentary canal 132. The ileocecal portal 154 is formed for simulating an ileocecal valve, and the cecal chamber 156 is formed for simulating a cecum, having a cavity 158 for simulating the orifice of an appendix, and having an overhead chamber 160 for simulating an ascending colon.

From the cecal chamber 156 the passage 78 breaches the alimentary canal 132 at an exit opening 162, entering a first transition tunnel 164 that connects to a bladder chamber 166. The exit opening 162 is star-shaped and the transition tunnel 164 is uniformly cylindrical in form for emphasizing that the departure from the alimentary canal 132 is not by way of a natural opening.

The transition tunnel 164 passes proximate a scrotal cavity 168 having a testicle structure 170 therein and in view of the riders 76, the structure 170 simulating a testis of the man 14 and having an epididymis member 172 and a ductus deferens member 174 attached thereto for simulating the human counterparts. The bladder chamber 166 is formed to include an opening 176 for simulating a urethra, the track structure 72 turning away therefrom and entering a narrow ureteral portion 178 of the passage 78 that forms a simulated ureter. The passage 78 ascends from the exit opening 162, through the first transition tunnel 164, the bladder chamber 166, and the portion 178 for climbing above the small intestine portion 142 and the cecal chamber 156, continuing into a kidney cavity 180 for simulating the interior structure of a kidney.

From the kidney cavity 180, the passage 78 enters a second transitional tunnel 182 through a breach 184 therein, the tunnel 182 connecting an ovarian cavity 186 that simulates the internal structure of an ovary of the woman 16. Within the ovarian cavity 186 are a plurality of follicle members 188, designated 188a, 188b, and 188c in FIG. 2, for simulating egg follicles in various stages of development. The follicle member 188c is fully formed and located proximate a fimbrial portal 190 of the passage 78 for simulating the impending discharge of an ovum. Also within the ovarian cavity 186 is at least one luteal member 192 for simulating a corpus luteum that is formed following discharge of the ovum. From the fimbrial portal 190, the passage 78 continues into a fallopian channel 194 for simulating a uterine tube of the woman 16, the fallopian channel having a plurality of egg members 196 therein, designated 196a, 196b, and 196c in FIG. 2, for simulating discharged ova in various stages. The member 196a simulates an unfertilized ovum, the member 196b simulates penetration of an ovum by a sperm cell, and the member 196c simulates a blastomere.

From the fallopian channel 194, the passage 78 enters a uterine cavity 198 that simulates the interior of a uterus, and having another of the egg members 196 therein, designated 196d, for simulating a blastocyst that has attached to the uterine wall. On one wall portion of the cavity 198 has a placental member 200 formed thereon for simulating a placenta, an umbilical member 202 attached thereto for simulating an umbilical cord and extending to a fetal structure 204 within the cavity 198 for simulating a developing fetus. The track structure 72 curves partially around the fetal structure 204 for emphasizing the importance thereof and exits the uterine cavity 198 through a break 206 therein, the passage continuing through a third transitional tunnel 208 into a liver cavity 210.

The liver cavity 210 is formed for simulating the structure of a human liver, having a very much enlarged liver module 212 therein for simulating a hexagonal liver lobule. The module 212 has six groups 214 of three passages at the six outer corners thereof, each group 214 simulating respective branches of a portal vein, a hepatic artery, and a bile duct of the liver. Also, the module 212 has a central passageway 216 for simulating a central vein of the lobule, and through which the track structure 72 passes, the passage 78 continuing into a vein portion 218 of a cardiovascular canal 220. Further, the outside of the liver cavity 210 has a gall member 222 formed thereon, the gall member simulating the exterior of a gall bladder and being visible to the approaching riders 76 from the third transitional passage 208.

The vein portion 218 of the cardiovascular canal 220 includes a valve structure 224 for simulating a venal valve, the valve structure 224 having opposite flexible flapper members 226 which are moved apart by the cars 74 that pass therebetween. From the vein portion 218, the passage 78 continues into a first chamber 228 of a heart structure 230, the first chamber 228 simulating a first heart ventricle. The passage 78 next enters a second chamber 232 by way of a bicuspid portal 234 that is formed for simulating a bicuspid (mitral) heart valve. From the second chamber 232, the passage 78 enters a third chamber 236 by way of a septum portal 238. The septum portal 238 is shaped for suggesting that entry into the third chamber 236 is through a non-natural opening, preferably simulating a cross-section of the interventricular septum. The track structure 72 is aligned in the third chamber 236 for displaying a tricuspid structure 238, the tricuspid structure 238 simulating the down-stream side of a tricuspid valve. From the third chamber 236 the passage 78 continues into an arterial portion 250 of the cardiovascular canal 220 by way of a semilunar portal 240 that simulates a pulmonary semilunar valve.

In the present invention, the heart structure 230 is provided with flexible wall members 252, the wall members 252 being operable in a pulsatory manner for producing a simulated heartbeat as best shown in FIG. 7. The heart structure includes a rigid housing 254 enclosing the second chamber 232 and the third chamber 236, each chamber being lined with one or more of the flexible wall members 252 such that a wall cavity 256 is formed between each wall member and the housing 254. The wall cavities 256 associated with each chamber are connected by a suitable hydraulic conduit 258 to a hydraulic cylinder 260, cyclic operation of the cylinder 260 being produced by a motor 262 and cam mechanism 264 that is operatively coupled thereto. Thus the pulsatory motion is produced by hydraulic pressure within the cavities cyclicly deflecting the flexible wall members 252 in response to operation of the cylinder 260 by the mechanism 264. As further shown in FIG. 2, the chambers are separately connected to a pair of the cylinders 260 for producing a desired phase relationship between pulsations according to the angular placement of the cylinders 260 about the cam mechanism 264.

The passage 78 continues along the arterial portion 250 into a lung structure 270, exits the cardiovascular canal 220 via a break portal 272 into a bronchial portion 274 of respiratory canal 276, the bronchial portion 274 being formed for simulating a lobar bronchi within the lung structure 270, from which simulated lung tissue is visible to the riders 76. The simulated lung tissue includes a normal tissue portion 278 which is colored in shades of pink, and an abnormal tissue portion 280 which is blackened for simulation of a smoker's lung, and that exhibits one or more pathological conditions such as emphysema and lung cancer.

From the bronchial portion 274, the passage 78 continues through a tracheal portion 282, exiting the respiratory canal 276 at the unloading station 80 described above. The track means advantageously contributes to perceived realism along the passage 78 as well as rider amusement by appropriate changes in elevation and velocity along the way. As described above, the track structure 72 descends in the esophagal portion 130 toward the stomach. Further, the structure 72 continues to descend until the cars become partially submerged in the lake 136 of the stomach, preferably with considerable splashing. Moreover, from a relatively high velocity, the cars 74 move slowly in the stomach portion 134, then quickly accelerate as they pass the sphincter portal 144, slowing again in the small intestinal portion 142, but moving in surges for simulating intestinal activity. The cars 74 also move with rather violent surges in velocity within the heart structure 230, the surges preferably being synchronized with the pulsatory motion of the wall members 252 thereof for greatest sensational reinforcement. The surges continue with lesser intensity in the arterial portion 250. In the respiratory canal 276, the cars 74 move with mild surges in velocity, but with momentary changes in direction for simulating a pattern of breathing.

According to the present invention, the apparatus 10 is adapted for creating realistic advertising opportunities that also attract potential visitors. For Example, the simulated drink container 38 can exhibit a beverage logo as well as housing a beverage vending station, and the simulated timepiece 40, in addition to showing the correct time, can carry a promotional trademark. Further, the apparatus 10 includes a simulated lunch sack structure 290 and radio structure 292 that can also carry appropriate advertising material without detracting from the realism of the apparatus. The sack structure 290 can house a snack bar, in addition to electronic control apparatus for the track means 70 and related simulative devices, and the radio structure 292 can house an air conditioning system as well as maintenance and office facilities of the apparatus 10. The radio structure 292 can also provide a realistic speaker platform for a hawker's message in the form of a simulated radio broadcast.

Another attractive aspect of the present invention is its large size. The structure 12 can be conveniently made from about 100 to about 1000 feet long, from about 50 to about 500 feet wide, and from about 30 to about 500 feet high. In these sizes, the apparatus 10 may be clearly seen from great distances, arousing curiosity and attracting visitors. In a preferred configuration that provides an advantageous combination of large size for visitor attraction and ride possibilities, moderate requirements for real estate, and ease of construction, the structure 12 measures about 300 feet long, about 150 feet wide, and from about 45 to about 50 feet high.

Although the present invention has been described in considerable detail with reference to certain preferred versions thereof, other versions are possible. For example, the external appearance of the structure 12 can reflect a desired ethnic background of the man 14 and the woman 16. Also, the track means 70 can be configured to greatly enhance the physical sensational aspects by covering great distances and elevational changes at high speed. Moreover, the simulation of normal and abnormal conditions can be in conjunction with the use of respective smiling and frowning characterizations of the corresponding organs. Therefore, the spirit and scope of the appended claims should not necessarily be limited to the description of the preferred versions contained herein.

What is claimed is:

1. An educational amusement ride apparatus comprising:
 (a) a humanoid-shaped building structure, the exterior thereof having a body portion, a head portion, a neck portion connecting the head portion to the body portion, an arm portion extending from the body portion and having a hand portion attached thereto, the head portion comprising a mouth member, a chin member, and a head chamber for simulating an oral cavity and for receiving the riders proximate the mouth member; the arm portion and the hand portion being adapted for guiding the riders from outside the apparatus into the head chamber;

(b) a passage within the structure for simulating internal human physiology;

(c) track means for transporting the riders along the passage; and (d) means for presenting physiological information to the riders, as the riders move within the passage.

2. The apparatus of claim 1 further comprising at least two simulated teeth in the head chamber, including a first simulated tooth for simulating a normal tooth condition and a second simulated tooth for simulating a diseased tooth condition.

3. The apparatus of claim 1 wherein the track means comprises means for loading the riders proximate the head chamber, means for unloading the riders subsequent to the transporting along the passage, and means for guiding the riders away from the building structure.

4. An educational amusement ride apparatus comprising:

(a) a humanoid-shaped building structure, the exterior thereof having a body portion, a first head portion for simulating the head of a man, and a second head portion for simulating the head of a woman, the first head portion comprising a mouth member, a chin member, and a head chamber for simulating an oral cavity and for receiving the riders proximate the mouth member, the structure further having an arm portion and a hand portion attached thereto and adapted for simulating support of the chin member, the arm portion and the hand portion being adapted for guiding the riders from outside the apparatus into the head chamber;

(b) a passage within the structure for simulating internal human physiology, comprising;

(i) an alimentary passage portion for simulating an alimentary canal, the alimentary passage portion comprising an esophagus portion for simulating the interior of an esophagus, a stomach portion for simulating the interior of a stomach; and an intestine portion for simulating the interior of an intestine;

(ii) a cardiovascular passage portion for simulating a cardiovascular canal; and (iii) a reproductive passage portion for simulating human reproduction, the reproductive passage portion comprising an ovary portion for simulating the interior of an ovary, including stages in the development and delivery of egg cells, an oviduct portion for simulating the interior of a uterine tube, and a uterus portion for simulating the interior of a uterus, including a developing fetus therein; and (c) track means for transporting the riders along the passage, comprising means for loading the riders proximate the head chamber, means for unloading the riders subsequent to the transporting along the passage, and means for guiding the riders away from the building structure.

* * * * *